FIG. I

INVENTOR
WILBUR M. BROWN
BY Wilbur K. Poore
ATTORNEY

Nov. 21, 1961 W. M. BROWN 3,009,240
METHOD OF AND APPARATUS FOR ASSEMBLING BALL POINT WRITING TIPS
Filed July 29, 1957 3 Sheets-Sheet 2
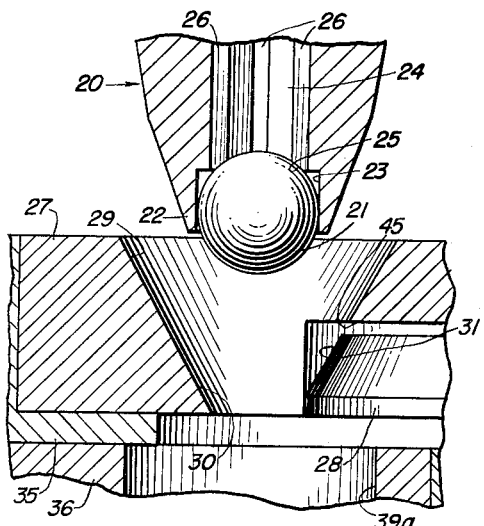
FIG. 2
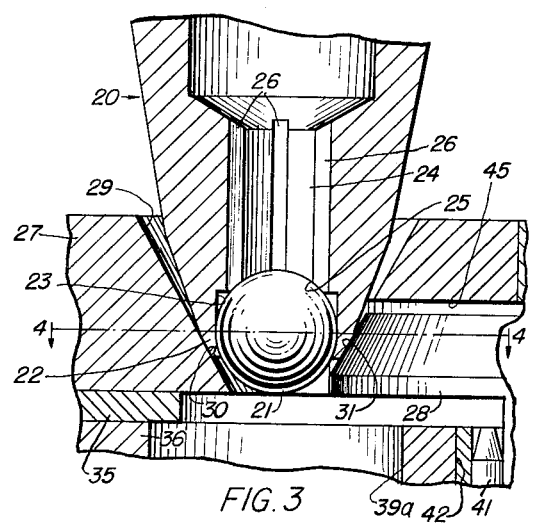
FIG. 3
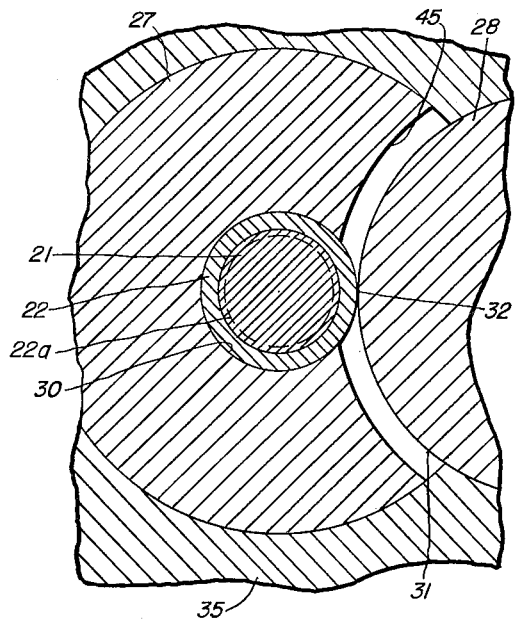
FIG. 4
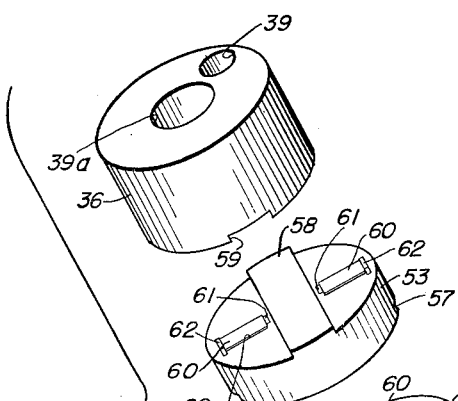
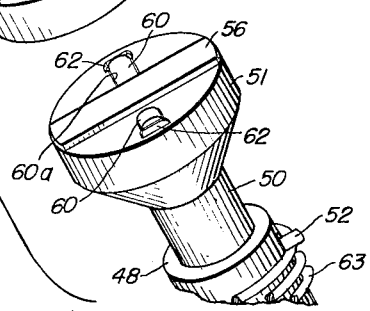
FIG. 5
INVENTOR
WILBUR M. BROWN
BY Wilbur K. Olson
ATTORNEY

INVENTOR
WILBUR M. BROWN
ATTORNEY

United States Patent Office 3,009,240
Patented Nov. 21, 1961

3,009,240
METHOD OF AND APPARATUS FOR ASSEMBLING BALL POINT WRITING TIPS
Wilbur M. Brown, Fort Madison, Iowa, assignor to W. A. Sheaffer Pen Company, Fort Madison, Iowa, a corporation of Delaware
Filed July 29, 1957, Ser. No. 674,902
12 Claims. (Cl. 29—441)

This invention relates to the manufacture of ballpoint writing instruments and has special reference to a method of and a device for rotatably confining a ball in a writing tip.

More particularly, this invention relates to a method of rotatably confining a ball in a cavity formed in the forward end of a writing tip, which consists of applying sliding pressure to a portion of the periphery of the forward end in the region of a transverse plane passing through the center of the ball, and simultaneously applying a rolling pressure to another portion of the periphery.

This invention also particularly relates to a device for rotatably confining a ball in a cavity formed in the forward end of a writing tip, the device comprising a die member providing a surface inclined to the axis of and adapted for contact with the forward end, a swedging element having a face aligned with the surface and also arranged to contact the forward end, the surface and the face simultaneously contacting the forward end, there being means for imparting relative rotation between the die member and the tip while they are in contact whereby the swedging element rotates relative to the die member and around the tip.

In writing instruments of the type commonly known as ball point pens, a relatively minute ball or bearing is rotatably held in a cavity which is formed in the forward tapered end of the writing tip and which communicates with a rearwardly extending ink reservoir. The cavity generally includes one or more seating elements against which the ball rotates during use of the instrument, and a recess or plurality of conduits or grooves to insure continuous contact between the ink and the surface of the ball within the cavity. The ink is then applied to a writing surface by virtue of the clearance between the ball and the inwardly formed forward end of the cavity, which not only retains the ball in position but allows only a thin film of ink to adhere to the ball surface as it rotates into contact with the paper or other material being used.

Due to the minute size of the balls usually used in ball point pens, the dimensions and finish of the tip, and particularly of the cavity, must be controlled very closely to insure satisfactory writing performance of the instrument. Also, for commercial production purposes, it has been found desirable to produce the tip as one integral piece and subsequently insert the ball into the cavity. In this process, the forward end of the tip is formed inwardly and around the ball so as to extend slightly beyond its largest point or equator. This forming of the forward end is a very critical operation as the desired clearance between the ball and the inwardly extending lip is on the order of a few millionths of an inch. If this gap or clearance is oversize or uneven, an undesirably heavy laydown will result, and if too tight the pen may not write freely or with a line of satisfactory density.

This problem of properly forming the forward end of the writing tip around the equator of the ball to insure satisfactory functioning has long been recognized in the art, and a number of suggestions have been made for its solution. As an example, it has been proposed to close the tip by pressing it into a die member having a conical opening, which process merely bends the lip of the tip inwardly around the ball. Another device used for this purpose employs a plurality of rollers or swedging elements, in some cases in combination with a ball supporting pin, the pin or one of the elements acting upon the ball to retain it in the cavity and the other element or elements acting upon the tip end to swedge it inwardly. Furthermore, other suggestions have been made to close the tip end around a forming element which is subsequently removed so that the writing ball can be snapped into the cavity past the retaining lip.

Although several of these suggestions have been used commercially, problems have been encountered in obtaining the proper protrusion of the ball from the cavity, in providing the desired uniform closure of the tip, and in preventing damage to or distortion of the ball during the tip closing operation.

Accordingly, a principal object of this invention is to provide a method of and a device for mounting a ball in the cavity of a ball point tip in a manner to insure retention of the ball safely against dislodgment, freely rotatable and with adequate uniform ink clearance.

Another object of this invention is to provide a method of swedging the forward end of a writing tip around the ball without the application of pressure on the ball.

A further object of this invention is the provision of a method of and a device for accurately controlling the ball protrusion in writing tips.

A still further object of this invention is to provide a device for swedging the tip of a ball writing instrument around the ball, in which a minimum of pressure is required.

An additional object of this invention is the provision of a method of swedging closed a ball point writing tip by the simultaneous application of sliding and rolling pressures.

Further and additional objects and advantages of this invention will be apparent from the following description when taken with the accompanying drawings in which:

FIGURE 2 is an enlarged fragmentary view of the tip receiving portion of the closing device of FIGURE 1, with a tip positioned for insertion therein;

FIGURE 3 is similar to FIGURE 2 showing the tip closed about the equator of the ball at the completion of the swedging operation;

FIGURE 4 is a sectional view of the tip and tip receiving portion of the closing device taken along the line 4—4 of FIGURE 3;

FIGURE 5 is a perspective exploded view of the structure of FIGURE 1 for allowing transverse movement of the tip receiving portion of the closing device; and, FIGURES 6 through 11 show the several steps in the process of manufacturing the writing tip construction of FIGURES 2 and 3.

Figure 1:
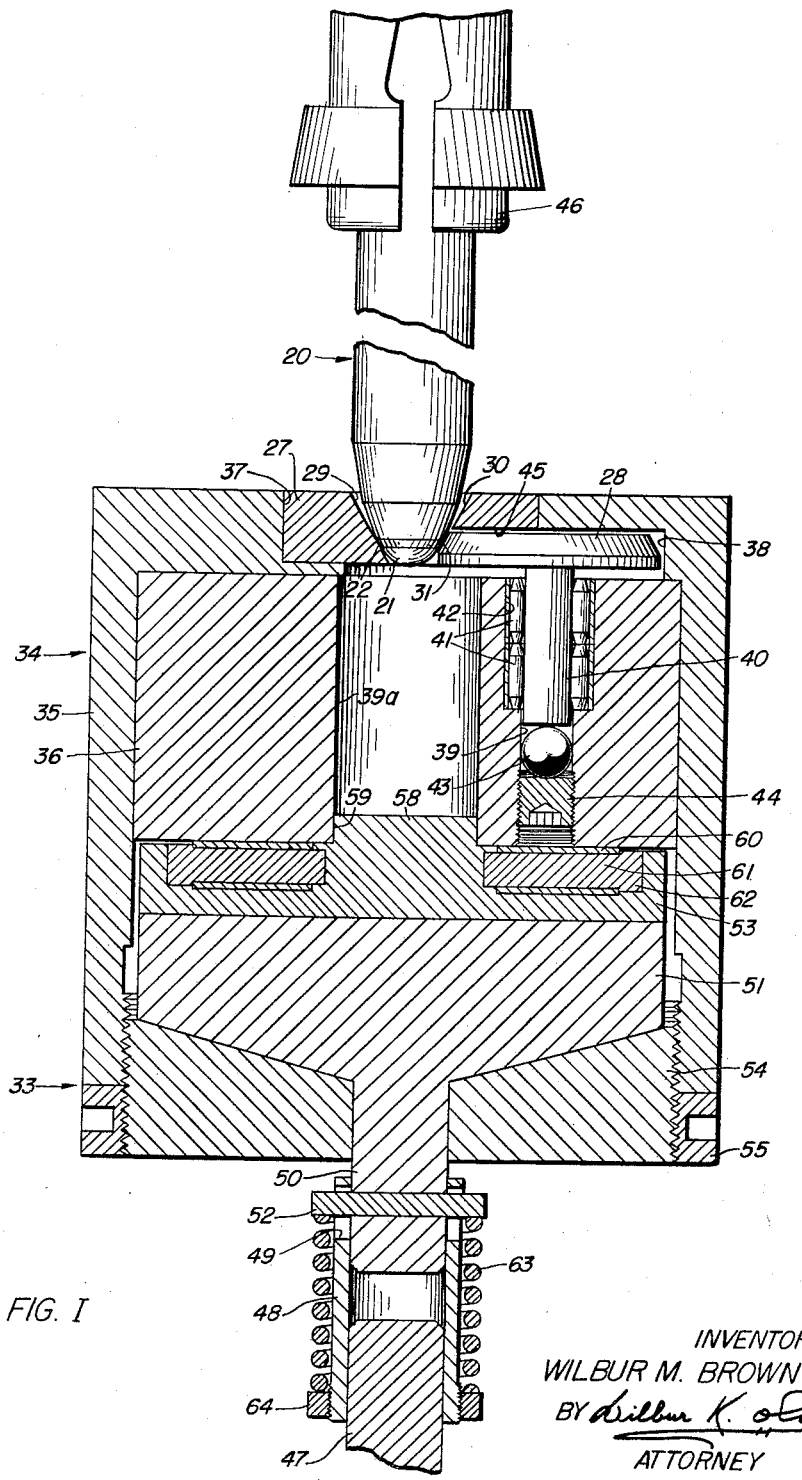
FIGURE 1 is a longitudinal sectional view of the preferred embodiment of this invention shown in operative relationship with a ballpoint writing tip.

Referring now to the drawings and particularly to FIGURE 1 thereof, there is provided a ballpoint writing tip 20 which has the usual writing ball 21 protruding from its forward tapered end 22. Located in the forward end 22, as can best be seen in FIGURE 3, is a cavity or recess 23 which snugly receives the ball 21 and which communicates with a rearwardly extending ink passageway 24 of reduced diameter. This difference in diameters between the cavity 23 and the ink passageway 24 forms a shoulder which is adapted to form one or more seating segments 25 against which the ball 21 rotates during writing use. In the tip construction shown in FIGURES 2 and 3, a plurality of feeding channels 26 are provided coextensive with ink passageway 24, these channels providing an uninterrupted flow of ink to the surface of the ball in a manner to be described more fully hereinafter. To retain the ball in the cavity 23, the forward end 22 may be swedged or otherwise formed inwardly around the ball 21 in the region of a transverse plane passing through its center, as can be readily seen in FIGURE 3.

When the tip 20 is frictionally or otherwise assembled with a reservoir section, not shown, the ink passageway 24 and channels 26 allow uninterrupted entry of ink into the cavity 23 and into contact with the major portion of the surface of the ball 21 in the cavity. So that a desirable amount of ink can be deposited during writing use of the pen, a uniform clearance or gap on the order of a few millionths of an inch must exist between the outer surface of the ball 21 and the inner surface of the cavity 23 after the inward forming of the forward end 22.

As pointed out heretofore, various suggestions have been made for swedging or forming the forward end of a ball point writing tip around the equator of the ball, but that such procedures have been found unsatisfactory in certain respects. In accordance with the present method, this swedging or forming of the forward end of the writing tip is effected by the substantially simultaneous application of sliding and rolling pressures on different portions of the tip in the general area or region of a transverse plane passing through the center of the ball. The sliding pressure is afforded by the die member 27, and the rolling pressure by the rotatable swedging element 28. The die member 27, preferably made of a wear resistant material such as carboloy, has an inverted conical aperture 29 which provides a discontinuous surface or annular area 30 inclined to the axis of the tip and adapted for contact with the forward end 22, as best illustrated in FIGURES 3 and 4. The tip 20 and the surface 30, which embraces a major or substantial portion of periphery of the forward end 22 (see FIGURE 4), have a common axis and thus provide concentric contact areas. The swedging element 28, made of carboloy or some other hardened material, is in the form of a small rotatable disc having a conical or tapered face 31 which is positioned in the discontinuity in alignment with the surface 30 of the die member 27 and which provides a point of pressure contact 32 with another portion of the forward end 22.

When the writing tip 20 is brought into an operative relationship with the die member 27 and the swedging element 28, as illustrated in FIGURES 1 and 3, and relative rotation is established therebetween, the inwardly directed supporting pressure of surface 30 slidably revolves around the periphery of the forward end 22 while at the same time the swedging element 28 revolves relative to the die 27 and around the forward end 22 in rolling contact therewith. The combination of the sliding and rolling pressures cause the forward end 22 to flow around the equator of the ball 21, the opposed convex arc of the swedging element 28 resulting is a slight spring back of the metal of the forward end 22 from the ball to produce a clearance between the ball and the cavity. This clearance can be very closely controlled to produce the desired writing characteristics by varying the speed of relative rotation, the contact pressure or the time of contact between the tip 20 and the die member 27. Because substantially the entire periphery of the forward end 22 is subjected to an inwardly and slightly upwardly directed pressure, the ball remains centrally positioned in the cavity and is urged snugly against the seating segments without the application of any direct pressure on the ball itself.

One of the most important advantages of this method of closing the tip is the elimination of the necessity of utilizing a pin, roller, or similar element to hold the ball in the cavity and against the seating segments during the tip closing operation. The contact with such pins or rollers as used in closing devices proposed heretofore, has caused a certain percent of rejects because of scratched or deformed balls. In some cases, these rejects may not be located during the normal manufacturing inspection procedures, and result in unsatisfactory service of the pen after sale to the ultimate consumer.

It will be noted in FIGURE 2 that the ball 21 is lightly retained by friction in the cavity 23, and that the tip 20 is pointed downwardly while the forward end 22 and the die 27 are brought into engagement. However, if it is desired to relatively loosely deposit the ball 21 into the cavity 23, the tool generally indicated by the number 33 and the tip 20 may be inverted so that the forward end 22 is positioned upwardly prior to and during the closing operation.

Another important advantage of the method of this invention is that the flow of the forward end 22 around the ball 21 is substantially predetermined by adjusting the contact pressure, the speed of relative rotation or the period of contact, or each of them, between the forward end and the closing device, thus providing a positive control of the protrusion of the ball from the closed forward end. The dotted line 22a in FIGURE 4 indicates approximately the desired distance that the closed or inwardly formed forward end 22 extends past the equator of the ball 21.

The preferred form of device or tool embodying this method of operation is shown in FIGURES 1 through 5. In this embodiment, the tool 33 comprises a head portion 34 which, for convenience of assembly of the various parts, includes a cover 35 and a core member 36. The cover has a centrally located upper circular recess 37 and a lower offset recess 38, the lower recess being coaxially aligned with a longitudinal aperture 39 in core member 36. A central longitudinal aperture 39a is also provided in core member 36. As best shown in FIGURE 1, the disc like head of the swedging element 28 is positioned in recess 38 with its axle 40 depending downwardly therefrom into aperture 39. A plurality of bearings 41, which may be needle type bearings, are mounted in the enlarged portion 42 of the aperture 39 to support and allow free rotation of the swedging element 28. The lower end of the axle 40 rests on a ball or bearing 43 which may be of hardened steel and which, in turn, is supported on a metal screw 44 threadedly engaged with the lower end of aperture 39 to allow longitudinal adjustment of the swedging element 28. The die member 27 is pressed into and tightly retained by recess 37. In addition to the inverted conical aperture 29, this member also has a recess or cut out portion 45 which extends transversely of the axis of the tip 20 and through a portion of the surface 30 to form a discontinuity in the region thereof adapted to contact the forward end 22. The head of the swedging element 28 is positioned in this recess 45, with its tapered face 31 being aligned with the surface 30.

Means are provided for imparting relative rotation between the tip 20 and the head portion 34, and such means may be arranged to act either upon the tip or the head portion, or both. However, in the preferred embodiment, the device 33, the various parts of which are fabricated from a high grade of steel unless otherwise specified, is caused to rotate relative to the tip 20, the tip being held in a collet 46 which is movable a predetermined distance toward the tool 33 by any one of a number of arrangements known to those skilled in the art of automated machinery. The rotational means provided in this embodiment comprise a rotatable shaft 47 which frictionally or otherwise holds a tubular sleeve 48 having axially opposed longitudinal slots 49. A shaft 50 which extends downwardly from a circular body member 51 is snugly but slidably received in the upper end of the tubular sleeve 48 and held non-rotational therewith by a hardened pin 52 which is mounted in a transverse aperture in shaft 50 and which extends through the slots 49. The body member 51 is slightly smaller in diameter than the inside diameter of cover 35 and is connected with the head portion 34 through a pair of transversely extending splines and grooves as best illustrated in FIGURE 5 and as described hereinafter. The body member 51 and the intermediate circular portion 53 are maintained in position within the lower end of the cover 35 by a collar 54 which is threadedly engaged with the cover 35. An internally threaded lock washer 55 is mounted on the body member 51 and abuts the lower edge of the cover 35. The rotatable shaft 47 is connected with or otherwise geared to an electric motor or the like, which is not illustrated.

In reference to FIGURE 5, the body member 51 has on its upper surface a transverse raised spline 56 which slidably fits into a groove 57 located in the lower surface of the intermediate piece 53. On the top surface of the intermediate piece 53 is a second transversely extending raised spline 58 which is positioned perpendicularly with respect to groove 57. This spline 58 is slidably received in a second groove 59 provided on the lower surface of the core 36. Thus, this spline and groove arrangement acts to transmit rotary motion from the shaft 50 to the head portion 34.

It will also be noted in FIGURE 5 that the upper surface of both the body member 51 and the intermediate piece 53 are provided with a pair of rollers 60 which are perpendicular to the raised splines in each piece. Each roller is positioned in a depression 60a, and rotatably mounted on a core pin 61 which is fixed to an anchor plate 62. When the tool is assembled as in FIGURE 1, these rollers comprise a means of permitting universal joint transverse movement of the die member 27 and the swedging element 28, which are carried by the head portion 34. Accordingly, the surface 30 may be perfectly aligned with the ball 21 and the forward end 22, and follow any eccentricity present in the tip or the collet which holds the tip. The degree of tightness of the threaded connection between the cover 35 and the body member 51 defines the limits of the transverse movement of the head portion.

A resilient spring member 63 is provided between the pin 52 and adjustable collar 64 on tubular sleeve 48. This resilient coil spring 63 is relatively stiff to support the weight of the tool 33 and allow limited axial movement thereof upon pressure contact with the tip 20, the shaft 50 sliding in the tubular member 48. This feature is provided to insure the same closing pressure on each tip processed, even though the collet 46 may not grasp successive tips at precisely the same distance from the forward end 22. The adjustable collar 64 is threaded on the tubular sleeve 48 and may be moved longitudinally thereon to vary the tension of the coil spring 63 to obtain more or less pressure between the device 33 and the writing tip 20.

It has been found that with the present method of closing a ball point writing tip, the spring pressure between the tool and the tip can be reduced approximately 70% and the revolutions of relative rotation reduced approximately 50% in comparison with the same operational cycle time as the usual type of rotatable closing tool previously proposed. This is accounted for by the fact that, except for a comparatively small area, the forward end of the tip is slidably supported by the die member around its circumference and no undesirable springing or distortion of the lip is produced. Also, because of the reduced pressure and revolutions required by this method, the finish on the lip and the protrusion of the ball therefrom can be much more closely controlled.

The method of the present invention may be used as a finishing operation afer preliminary die deformation or crimping of the forward end around the ball. Should this preliminary operation be employed, the method of this invention has a somewhat thinning action on the forward crimped end, it produces a very smooth finish thereon, and establishes an even and consistent predetermined clearance between the ball and cavity. However, the preliminary die forming operation is not necessary to the successful operation of the method of this invention, but may be employed merely for purposes of convenience in handling the tip and ball prior to the finishing operation.

FIGURES 6 through 11 illustrate the several steps in the process of manufacturing the writing tip construction shown in FIGURES 2 and 3. This tip blank is initially fabricated on a screw machine and may be made of a number of different metals of a free machining type such as a sterling silver alloy, aluminum, or brass that is substantially inert to the ink to be employed therewith. While various procedures may be used in the manufacture of this tip, it has been found desirable to insert the tip blank in the collet of a screw machine, and mount the various tools in a turret which is positioned in front of the tip and which is adapted to index them into position in the proper sequence. In certain of these operations it is necessary to produce relative rotation between the tip and the tool and in these instances the tip may be rotated by the collet in which it is held.

Figure 6:
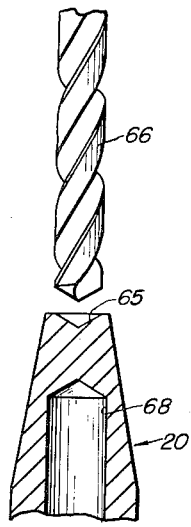
Figure 7:
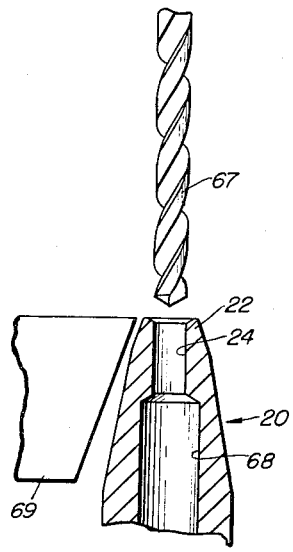

FIGURE 6 illustrates the step of providing a conical centering aperture 65 in the forward surface of the tip 20 by means of a drill 66. This step is performed primarily to provide a method of properly centering the very small diameter drill 67 which is used in the second step illustrated in FIGURE 7 to produce the ink passageway 24. This ink passageway may be approximately .025″ in diameter if a 1 mm. ball is to be assembled with the tip, it being understood that the diameter of the passageway 24 may be increased for a ball of more than 1 mm. and decreased for a ball measuring less than 1 mm. in diameter. The ink passageway 24 is coaxial with and in fluid communication with an enlarged ink passageway 68 provided previously in the tip blank. The forward end 22 of the tip 20 is, during the second step, subjected to the action of a skiving blade 69 to produce a somewhat sharper taper.

Figure 8:
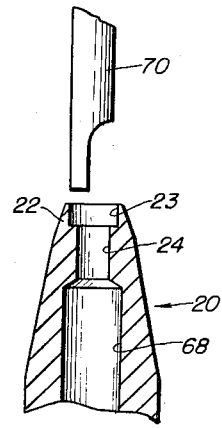

The third step as illustrated in FIGURE 8 is performed with a boring tool 70 which is provided with cutting edges on its lower and outer surfaces. The application of this tool produces a substantially flat bottomed cylindrical cavity 23 which is slightly smaller in diameter than the ball which may subsequently be inserted therein. It is also to be noted that the cylindrical cavity 23 is coaxially aligned with ink passageways 24 and 68.

Figure 9:
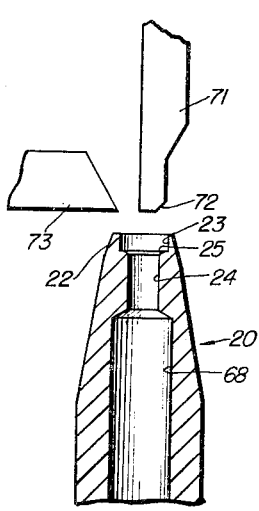
Figure 10:
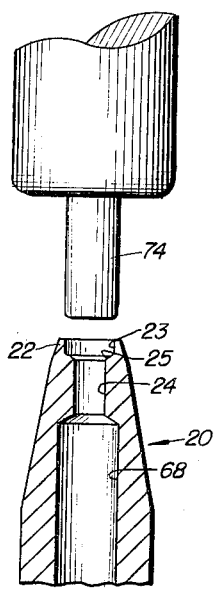

The fourth step as shown in FIGURE 9 is performed with a boring tool 71 having an angularly disposed cutting edge 72, which cutting edge produces a tapered seating portion 25 in the form of a frustum of a cone with a 30° angle. Simultaneously, a second cutting blade 73 is brought into contact with the forward end 22, which tool faces the lip to a predetermined distance from the bottom of the cavity 23.

During the four steps just described, the tip 20 is rotated relative to the tools to produce the described cutting action. During the following two steps, illustrated in FIGURES 10 and 11, both the tip and the tool are held in a non-rotational relationship.

Although the longitudinal surface of the cavity 23 is relatively smooth following the use of the boring tool 70, it has been found desirable to insert a punch 74 in the cavity 23, which produces a very fine finish on this surface. The punch 74 is approximately .005″ larger than the diameter of the cavity 23 following the step illustrated in FIGURE 8, and in addition to producing the fine finish on the interior of the cavity, it stretches it slightly to the desired size.

Figure 11:
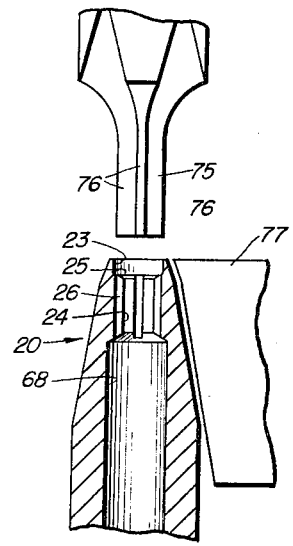

FIGURE 11 illustrates a broaching tool 75 having four outstanding ribs or piercing elements 76 each of which is effective to form a feeding channel 26 which extends from the upper portion of the seat area 25 to the enlarged feeding ink passageway 68. The channels 26 divide the seat area 25 into separate seating segments thereby allowing sufficient space for the exit of ink therefrom to the cavity 23. During this operation, the tip is again subjected to the action of a skiving blade 77 to remove any exterior irregularities in the tip which may have been caused by distortion during the punch or broach operations. This skiving is done after the broach 75 is disengaged from the tip 20, which then may be rotated by the collet of the screw machine.

It is to be understood that although one particular tip construction is illustrated and described herein, the method and device of this inventoin are not to be limited thereto as any of the usual type of ball point writing tips may be employed therewith. Also, it is apparent that various modifications may be made without departing from the true spirit and scope of this invention. As an example, a rotatable spherical ball may be used in substitution of the disc like swedging element, or the swedging element may have a curved face.

It will be understood, therefore, that this invention is not to be limited to the embodiment described above, and it is contemplated, by the appended claims, to cover any such modifications as fall within the true spirit and scope of this invention.

I claim:

1. A device for rotatably confining a ball in a cavity formed in the forward end of a writing tip, comprising a die member providing a discontiuous surface inclined to the axis of and adapted for contact with a major portion of said forward end, in the region of a transverse plane extending through the center of the ball, said tip and said surface having a common axis, a swedging element mounted for rotation relative to said die member, said swedging element having a face aligned with said surface and arranged to contact said forward end in the region of said plane, said surface and said face simultaneously contacting said forward end, and means for imparting relative rotation between said die member and said tip while they are in contact whereby said swedging element rotates relative to said die member and around said forward end.

2. A device for rotatably confining a ball in a cavity formed in the forward end of a writing tip, comprising a die member providing a conical surface having a discontinuity herein, said surface being inclined to the axis of said tip and adapted to contact a continuous area extending over a major portion of the periphery of said forward end in the region of a transverse plane passing through the center of said ball, a swedging element mounted for rotation relative to said die member, said swedging element having a tapered face aligned in said discontinuity with said surface and arranged to contact another portion of said periphery in the region of said plane, said surface and said face simultaneously contacting said forward end, and means for imparting relative slidable rotation between said die member and said tip while they are in contact whereby said swedging element rotates relative to said die member and around said forward end.

3. A device for rotatably confining a ball in a cavity formed in the forward end of a writing tip, comprising a die member providing a conical surface having a discontinuity therein, said surface being inclined to the axis of said tip and adapted for slidable contact with a continuous area extending over a major portion of said forward end in the region of a transverse plane passing through the center of the ball, said tip and said surface having a common axis, a swedging element mounted for rotation relative to said die member, said swedging element having a tapered face in said discontinuity aligned with said surface and arranged to contact another portion of said forward end in the region of said plane, said surface and said face simultaneously contacting said forward end, means for imparting relative slidable rotation between said die member and said tip while they are in contact whereby said swedging element rotates relative to said die member and around said forward end, and means permitting limited joint movement of said die member and said swedging element transversely of the axis of said forward end.

4. A device for rotatably confining a ball in a cavity formed in the forward end of a writing tip, comprising a head portion, a die member carried by said head portion and providing an inclined surface axially aligned with said tip and having a discontinuity therein, said surface being adapted for slidable contact with a continuous area extending over a major portion of said forward end in the region of a transverse plane passing through the center of the ball, a tapered swedging element rotatably supported by said head and having a face in said discontinuity aligned with said conical surface and arranged to contact said forward end in the region of said plane, said conical surface and said tapered face simultaneously contacting said forward end, and means for imparting relative rotation between said head portion and said tip whereby said swedging element rotates relative to said die member and around said forward end while said die member and said tip are in slidable contact, said die member and said swedging element being spaced from said ball while in contact with said forward end.

5. A device for rotatably confining a ball in a cavity formed in the forward end of a writing tip, comprising a die member providing a conical surface having a discontinuity therein, said surface being axially aligned with and adapted for slidable contact with said forward end in the region of a transverse plane passing through the center of said ball, said die member having a recess extending transversely of the axis of said tip and connecting with said discontinuity in said surface in the region thereof adapted to contact said forward end, a swedging element positioned for rotatable movement in said recess and having a tapered face in said discontinuity aligned with said surface and arranged to contact said forward end in that region of said plane, said surface and said face simultaneously contacting said forward end, means for imparting relative slidable rotation between said die member and said tip while they are in contact whereby said swedging element rotates relative to said die member and around said forward end, and means permitting limited joint movement of said die member and said swedging element transversely of the axis of said forward end.

6. A device for rotatably confining a ball in a cavity formed in the forward end of a writing tip, comprising a head portion, a die member carried by said head portion and having an inverted conical aperture axially aligned with said tip and providing an inclined surface having a discontinuity therein, said surface being adapted for slidable contact with a major portion of said forward end in the region of a transverse plane passing through the center of said ball, a swedging element rotatably supported by said head and having a tapered face in said discontinuity aligned with said surface and arranged to contact another portion of said forward end in the region of said plane, said surface and said tapered face simultaneously contacting said forward end, means for imparting relative rotation between said head portion and said tip whereby said swedging element rotates relative to said die member and around said forward end while said die member and said tip are in slidable contact, means permitting limited movement of said head portion transversely of the axis of said forward end, and a resilient member associated with said head portion for allowing limited axial movement thereof.

7. A device for rotatably confining a ball in a cavity formed in the forward end of a writing tip, comprising a head portion, a die member carried by said head portion and having an inverted conical aperture axially aligned with said tip and providing a surface having a discontinuity therein, said surface being adapted for slidable contact with a major portion of the periphery of said forward end in the region of a transverse plane passing through the center of said ball, said die member having a recess extending transversely of the axis of said tip and connecting with said discontinuity in said surface in the region thereof adapted to contact said forward end, a swedging element positioned for rotatable movement in said recess and having a tapered face in said discontinuity aligned with said surface and arranged to contact another portion of said periphery in the region of said plane, said surface and said tapered face simultaneously contacting said forward end, means for imparting relative slidable rotation between said die member and said tip while they are in contact to cause said swedging element to rotate relative to said die member and around said forward end, means permitting limited movement of said head portion transversely of the axis of said forward end, and a resilient member associated with said head portion for allowing limited axial movement thereof.

8. A device for rotatably confining a ball in a cavity formed in the forward end of a writing tip, comprising a head portion, a die member carried by said head portion and having an aperture axially aligned with said tip and providing a substantially conical surface having a discontinuity therein, said surface being adapted for slidable contact with a major portion of the periphery of said forward end in the region of a transverse plane passing through the center of said ball, said die member having a recess extending transversely of the axis of said tip and connecting with said discontinuity in said surface in the region thereof adapted to contact said forward end, a circular swedging element positioned for rotatable movement in said recess and having a tapered face positioned in said discontinuity aligned with said surface and arranged to contact another portion of said periphery in the region of said plane, said surface and said tapered face simultaneously contacting said forward end, means for rotating said die member relative to said tip while they are in contact causing said swedging element to rotate relative to said die member and around said forward end, means comprising a plurality of rotatable bearings cooperating with and permitting limited movement of said head portion transversely of the axis of said forward end, and a resilient spring member supporting said head portion for allowing limited axial movement thereof.

9. The method of rotatably confining a ball in a cavity formed in the forward end of a writing tip, which consists of applying a discontinuous sliding pressure to a major portion of the periphery of said forward end in the region of a transverse plane passing through the center of said ball, and simultaneously applying a rolling pressure to another portion of said periphery in the region of said plane.

10. The method of rotatably confining a ball in a cavity formed in the forward end of a writing tip, which consists of applying a predetermined and discontinuous sliding pressure on a continuous area extending over a major portion of the periphery of said forward end in the region of a transverse plane passing through the center of said ball, and simultaneously applying a rolling pressure to another portion of said circumference in the region of said plane.

11. The method of rotatably confining a ball in a cavity formed in the forward end of a writing tip, which consists of applying a predetermined and discontinuous sliding pressure on a continuous area extending over a major portion of the periphery of said forward end in the region of a transverse plane passing through the center of said ball, simultaneously applying a predetermined rolling pressure point to another portion of said periphery, and rotating said pressure point and said sliding pressure around said circumference in the region of said plane.

12. The method of rotatably confining a ball in a cavity formed in the forward end of a writing tip, which consists of applying a predetermined and discontinuous inwardly directed pressure on a continuous area extending over a major portion of the periphery of said forward end in the region of a transverse plane passing through the center of said ball, simultaneously applying a predetermined inwardly directed pressure point to another portion of said periphery in the region of said plane and rotating said pressure and said pressure point around said periphery to form said forward end around the equator of said ball in spaced relationship therewith.

References Cited in the file of this patent

UNITED STATES PATENTS

| | | |
|---|---|---|
| 2,313,474 | Hill | Mar. 9, 1943 |
| 2,325,522 | Lauer et al. | July 27, 1943 |
| 2,443,416 | De Wilde et al. | June 15, 1948 |
| 2,447,424 | Nightingale | Aug. 17, 1948 |
| 2,498,009 | Schrader et al. | Feb. 21, 1950 |
| 2,646,761 | Knobel | July 28, 1953 |
| 2,813,409 | Wolcott | Nov. 19, 1957 |
| 2,818,828 | Schachter | Jan. 7, 1958 |
| 2,851,868 | Larkin | Sept. 16, 1958 |
| 2,932,255 | Neukirch | Apr. 12, 1960 |

FOREIGN PATENTS

| | | |
|---|---|---|
| 1,032,475 | France | Mar. 25, 1953 |